Nov. 20, 1951  M. W. WILLIS  2,575,697
COMBINATION MEASURING INSTRUMENT FOR LAYOUT WORK
Filed Feb. 24, 1950  4 Sheets-Sheet 1

INVENTOR
MARVIN W. WILLIS,
BY McMorrow, Berman & Davidson
ATTORNEYS

Nov. 20, 1951 M. W. WILLIS 2,575,697
COMBINATION MEASURING INSTRUMENT FOR LAYOUT WORK
Filed Feb. 24, 1950 4 Sheets-Sheet 2
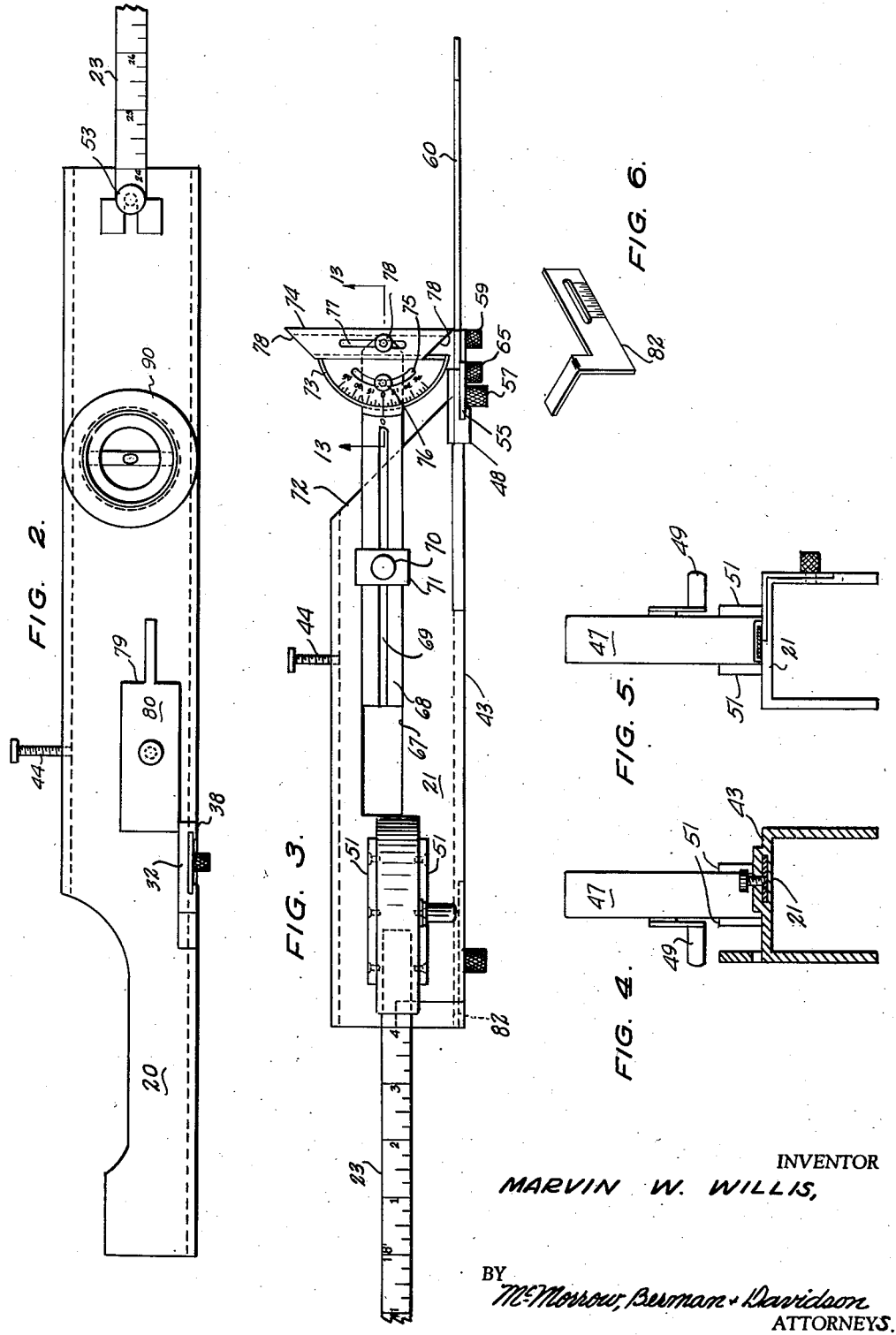
INVENTOR
MARVIN W. WILLIS,
BY McMorrow, Berman + Davidson
ATTORNEYS.

Nov. 20, 1951                M. W. WILLIS                2,575,697
          COMBINATION MEASURING INSTRUMENT FOR LAYOUT WORK
Filed Feb. 24, 1950                                 4 Sheets-Sheet 3
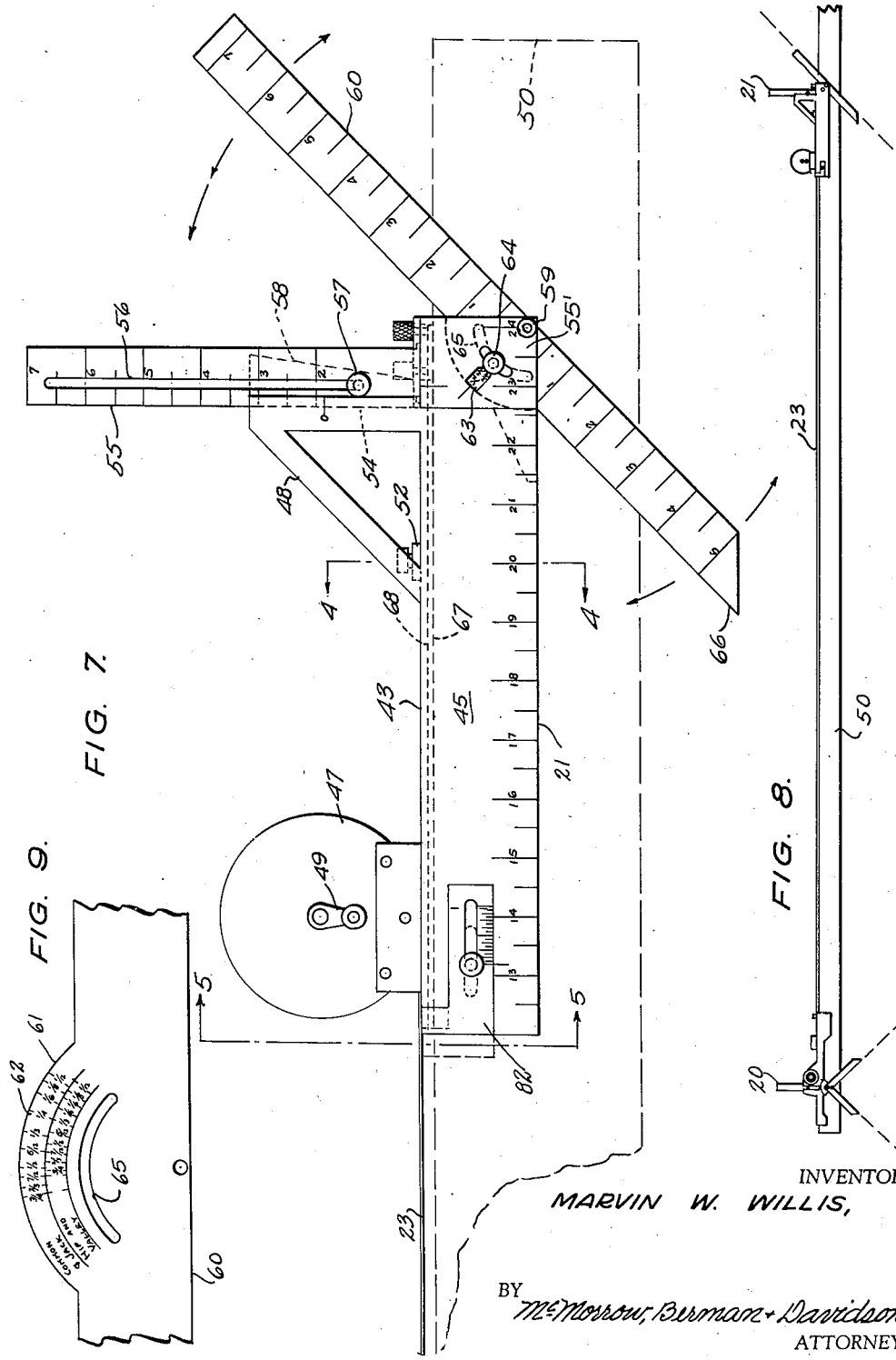
INVENTOR
MARVIN W. WILLIS,
BY *McMorrow, Berman & Davidson*
ATTORNEYS.

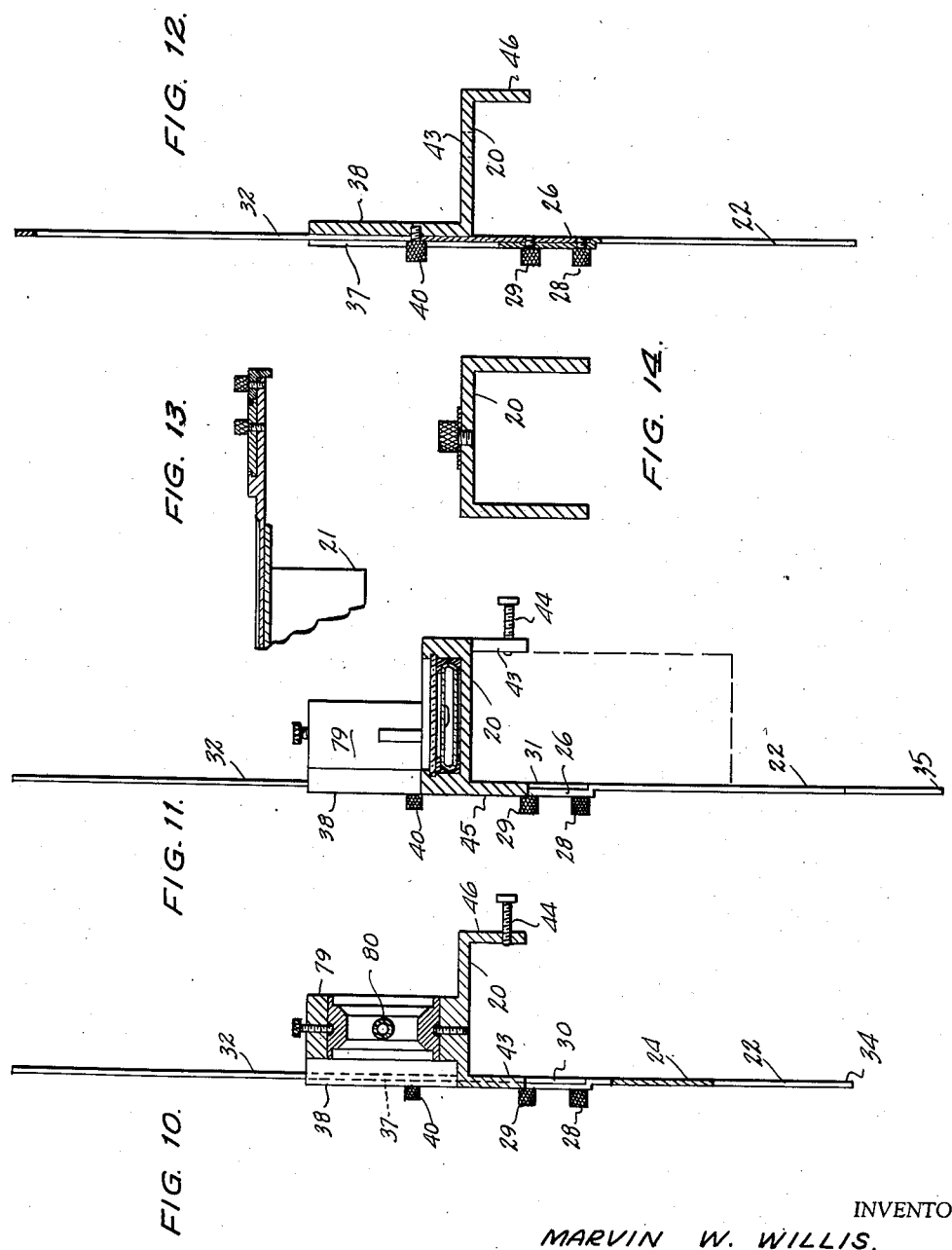

Patented Nov. 20, 1951

2,575,697

UNITED STATES PATENT OFFICE 2,575,697

COMBINATION MEASURING INSTRUMENT FOR LAYOUT WORK

Marvin W. Willis, Tahlequah, Okla.

Application February 24, 1950, Serial No. 145,996

3 Claims. (Cl. 33—97)

This invention relates to measuring instruments, and more particularly to those intended for laying out drawings and materials in carpentering and allied lines.

In the layout of rafters, stringers and other work of a layout character, the use of several tools is usually necessary, and their use involves considerable care, effort and more or less intricate calculations. The chance for error is considerable, tending to cause loss of time and effort, as well as injury to material that cannot be repaired. Combination instruments have been developed in certain instances which greatly facilitate the work of carpentering, but they are limited in scope and either too hard or cumbersome to conveniently use, or they may involve limitations that restrict it to certain professional uses. This invention is designed for comprehensive use so that it may be employed for many practical phases of industrial and mechanical work, and for the expeditious layout of items involving angles, straight lines and measurements in different ways on flat materials of regular cross-section. Briefly, the invention comprises a combination device of the straight-edge type in which are included leveling means, a protractor adjustably arranged, and a measuring tape for marking off appreciable spacings in between the elements of the device, all securely adjustable and lending themselves to a design that is compact, serviceable, convenient to handle and strong enough to withstand the average wear and tear of frequent use.

It is therefore an object of this invention to provide a new and improved measuring instrument for layout work that will avoid one or more of the disadvantages and limitations of the previous classes of instruments of a similar nature.

Another object of this invention is to provide a new and improved measuring instrument for layout work that can perform angular measuring, mitering and distant marking off and other incidental functions without such instrument being bulky, intricate or difficult to adjust and operate.

A further object of the hereindescribed invention is to provide a new and improved layout instrument that will be compact, easy to adjust and use, as well as effective in making many and continuous measurements and markings on a piece of work to be laid out.

An additional object of the invention is to provide a new and improved measuring tool for the layout of general carpentering work including rafter, stairs, girder and roofing details operable by a single individual conveniently and effectively.

Other objects of this invention will be apparent as it is more fully disclosed.

For a better understanding of the invention, its objects, principles and methods of operation, reference is made to the appended drawings. These drawings, in conjunction with the following description thereof, outline a particular form of the invention by way of example, not of limitation, while the claims emphasize the scope thereof.

Referring to the drawings in which all similar parts throughout are designated by the same reference characters:

Figure 2 is a plan view of Figure 1;

Figure 3 is a plan view of the ridge cut assembly used in this embodiment;

Figure 4 is a sectional view on the line 4—4 of Figure 7;

Figure 5 is a sectional detail along the line 5—5 of Figure 7;

Figure 6 is a detail of the vernier used in Figure 3 of this embodiment;

Figure 7 is a side elevation showing the ridge cut assembly including the measuring tape, ridge cut slide and ridge cut blade material to be marked for cutting;

Figure 8 is a diagrammatic view showing the elements indicated in Figures 1 and 7 mounted on rough timber for a rafter or beam to be marked for a layout;

Figure 9 is a detail of the dial used for placing the ridge cut scale in various adjustments;

Figure 10 is a sectional view taken on the line 10—10 of Figure 1;

Figure 11 is a transverse sectional view taken on line 11—11 of Figure 1;

Figure 12 is a sectional view taken on line 12—12 of Figure 1;

Figure 13 is a sectional detail on line 13—13 of Figure 3;

Figure 14 is a sectional detail on line 14—14 of Figure 1.

Figure 1:
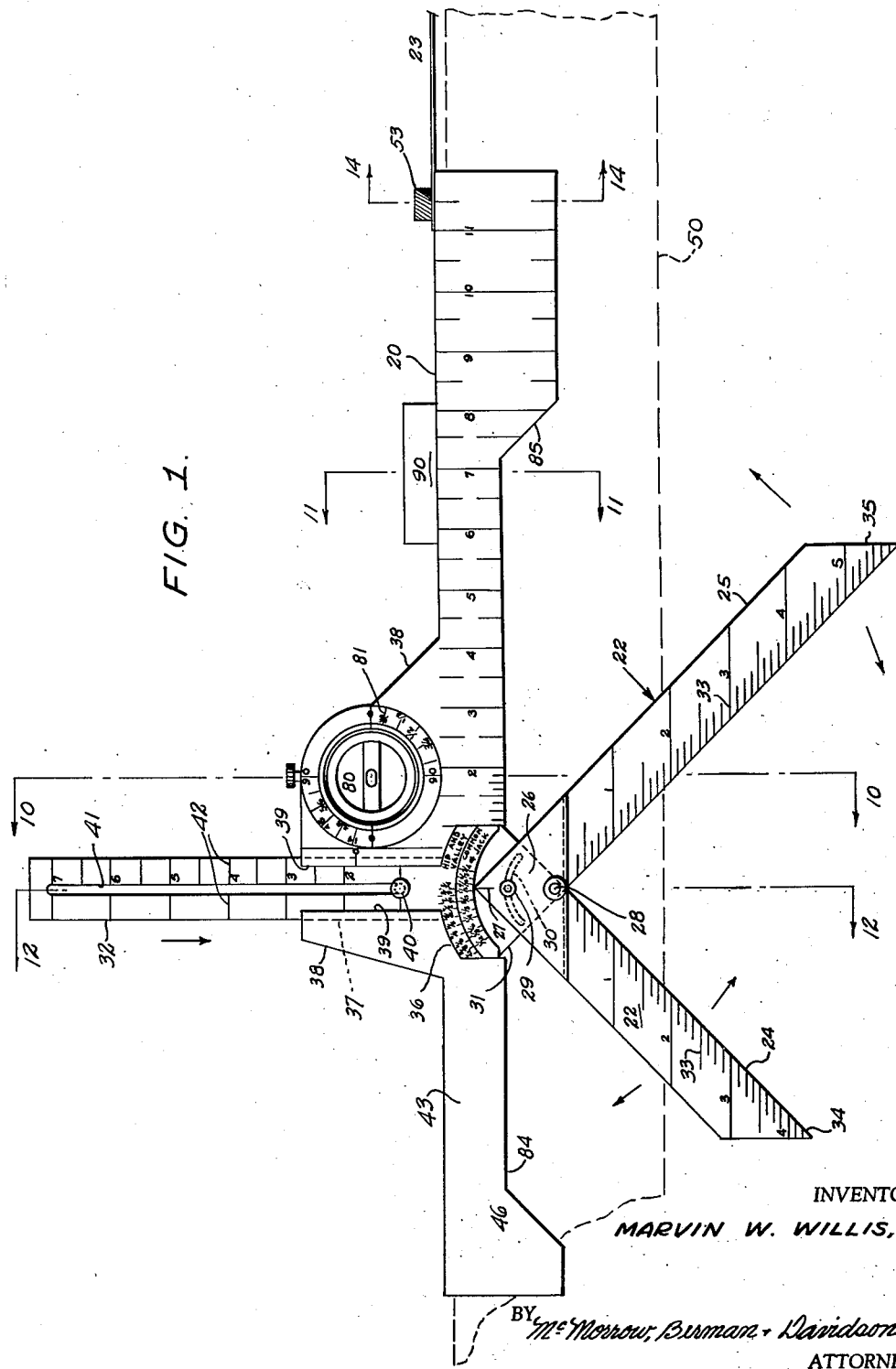
Figure 1 is a side elevation of a plate cut assembly of a layout measuring instrument embodying this invention, and shown applied to the construction of rafters.

In the construction shown in the drawings, a rafter measuring instrument consists of a unit with dual assemblies 20 and 21, respectively, operably joined by a conventional measuring tape 23 that is susceptible to extensible adjustment for distances. The assembly 20 is arbitrarily termed the plate cut assembly, while the other assembly 21 is termed the tape carrier and ridge cut assembly. Each will be discussed separately and its parts individually defined. The assembly 20 includes a square-like or ridge cut member 22 having two arms 24 and 25 of different lengths situated at right angles to each other. The arm 24 is the shorter and is integrally joined to the longer arm 25, and both formed with an apex portion 26. The apex portion 26 is marked with an indicator 27 at the apex and is pivoted on a pin 28 adjacent the area where the inner borders of the arms come to a point. Directly above the pivot point is a fastening bolt 29 passing through the portion 26 into an arcuate slot 30 provided in an apexed head 31 of a slider plate or plate cut slider 32, which also supports the pivot pin 28. Calibration lines are scribed in equally spaced divisions across the face of the member 22 to provide certain measurements selected for each arm. Suitable indices 33 are used to indicate the values of the divisions. The direction of the lines is angular to the edges of the arms to make them easier to observe, also, the end portions 34 and 35, respectively, are angularly cut, as indicated, but mainly to make them perpendicular to the rafter the arms are placed against. The head 31 is marked with a series of calibrations 36 suitably designated for various cuts in the rough timber for rafters to be made when the occasion arises. The cuts pertain to hip and valley, common and jack types, respectively, and the sizes of the material in question to be processed. The head 31 is of greater width than the slider plate 32 that it is integrally combined with, and has an arcuate upper border line that corresponds with the radial calibrations 36 and also acts as a stop to limit the upward travel of slider plate 32. The slider plate 32 reciprocates in grooves 37 extending vertically along the sides 39 of a column piece 38. When the slider plate is pushed downwardly in the grooves, it concurrently lowers the head 31 and the member 22. It is held in any adjustment on this column piece 38 by the fastening bolt 40 which is stationary on the column piece and acts within the slot 41 extended longitudinally along the plate 32. This plate is also calibrated, as shown by the markings 42, and indices thereon. These markings register with a zero line shown on the column piece 38 and gives a visual observation of the instant relative position of the plate and member with the channel or plate cut base 43 forming the carrier for the various parts mentioned and other to be referred to. This carrier 43 is of channel form, as indicated in Figure 10, and is movable longitudinally on the rafter timber 50, and may be clamped thereon through the use of the screw 44. The base 43 has lateral flanges 45 and 46 that lie flat against sides of the beam or rafter 50 and keep it upright on the latter. In the ridge cut assembly 21, a 50-foot steel tape measuring device 47 is mounted on the upper surface of the channel base 21 and extends vertically above it, so that the tape 23 may be drawn out flat against a horizontal surface in normal operation. The tape 23 is pulled out at the end designated the rear, as a matter of convenience, and is wound up with a handle 49 in a conventional way. The brackets 51 serve to hold the device 47 in place. The tape 23 is run against the upper surface of the channel 21 off the rear across the timber 50 to the assembly 20 where it can be secured by a stud 53. The purpose of this arrangement is to provide for the desired spacing of the assemblies 20 and 21 by positive measurement provided by the tape 43. A 45° triangular bracket 48 is vertically mounted on the front end of the assembly base 21 and is preferably provided with a 45° triangular opening 52 in its central area. The bracket is located at the side of the base and has a slot 54 cut in its face for the adjustment of flat rule 55 in a reciprocating and vertical manner, from the face of the base upwardly. The rule or scale 55 has a longitudinal slot 56 through which a fastening bolt 57 extends from an angular projecting wall 58 of the bracket 48. This enables the rule or scale to be moved up and down on the bracket and be held rigidly when desirable by the bolt 47, when the latter is tightened down. A zero mark is placed on the side of the bracket 48 to register during adjustment with the markings indicated on the side of the rule 55. The outside faces of the flanges of this base are also marked with spaced markings and indices, as indicated, for measuring purposes. The lower end portion 55' of the scale 55 has a pivot 59 passing through it transversely and supporting a tilting scale or ridge cut slide 60 rotatable in the general plane as that of the scale 55, but at the lower end thereof. The point of suspension is near the middle of the scale 60, and where a segmental, lateral protrusion 61 centered on the pivot is provided. This protrusion 61 is suitably marked in an arcuate manner for various types of indications 62, but specifically in this instance for various types of rafters to be marked off at 62 for cutting and to suit their widths. When the scale 60 is rotatably adjusted to the desired angle for scribing the cut, it brings the markings 62 in line with a window 63 cut out of the portion 55' for the purpose. Thus, when the scale is set at any angle on its pivot, the type of rafter that it will mark off properly will be automatically observable through the window. The scale is held fast in this position by the tightening of the bolt 64 on the scale portion 55', the arcuate slot 65 in the scale serving to permit the movement of the latter. The end portion 66 of the scale is sheared off to a point at an angle of 45°. The scale 60 is provided with suitable calibrations or markings on its longitudinal sides and edges for measuring purposes.

On the upper surface of the base 21 from the measuring tape device to the front end thereof and over the middle area thereof, a rectangular slot 67 longitudinally extends. A slider 68 fits tightly in this slot and can reciprocate longitudinally therein. It has a longitudinal rounded groove 69 recessed in its top portion, in which a bolt 70 pressing into it from a superimposed saddle 71 can operate. This last arrangement holds the slider in the slot 67 in appropriate adjustment. The slider 68 extends beyond the mitered end portion 72 of the base 21 and terminates in an end portion having converging sides on which is mounted a protractor or side cut dial 73 and also a side cut blade 74. The dial 73 is rotatable on an arcuate slot 75 guided by a stud 76 rigidly extending from the slider 68. The dial 73 is marked in degrees in both directions from a middle line and registers with a zero marking on the slider. The dial has a straight base line that is dovetailed into the blade 74 so that the latter may adjust itself laterally against it, and having a slot 77 and a set screw 78 may be held in the position selected. The end portions 78 of the blade 74 are chamfered off on an angle of 45° converging towards the circumference of the dial.

In the assembly 20, a vertical level 80 mounted in a housing 79 is attached to the column piece 38, the housing having markings 81 in degrees thereon. The level is of the conventional bubble type, but has a circular housing that is rotatably adjustable in the column. A horizontal level device 90 is mounted flat on the base 20 in a position just ahead of the level 80 and with its bubble at right angle to the direction of leveling of the vertical level. With the assembly 20 having the arms 24 and 25 of the square member 22 set at one half pitch or 45 degrees, the level 80 is rotated so as to also set it at a half pitch or 45 degrees, whereupon the assembly is placed upon a rafter so that the base 43 is supported on the upper side of such rafter, the level 80 indicating whether the base is truly longitudinally horizontal and the level 90 indicating whether the base is truly transversely horizontal. With the base 43 thus supported upon the rafter a portion of the side face below the pivot 28 and adjacent portions of the arms 24 and 25 are marked off, such marking constituting the inverted V-shaped cut to be made in the rafter. After this V-shaped marking has been made on the side face of the rafter the assembly 20 is removed from the rafter. Where the assembly 20 is to be used for determining whether an upstanding stud is truly vertical the square member 22 is removed and the level 80 is rotated to 90 degrees; whereupon the assembly is placed against a side edge of the stud so that the bottom of the base 43 bears against such edge, the level 80 indicating whether the stud is truly vertical. For determining the level of the rafter set at an angle of 45 degrees after erection, the square member is removed, and the level is rotated to the 45 degree mark, whereupon the assembly is placed upon the erected rafter so that the base 43 is supported upon the upper side of such rafter, the level 80 indicating whether the erected rafter is at the pitch of 45 degrees. The undercuts 84 and 85, respectively, align and fit the ends 34 and 35, so that when the arms 24 and 25 are rotated, either one will be close against the base and register accurately therewith and place the arm that is not fitted extended out at right angles to the base. This is, of course, possible only when the head 31 is in the proper position. The base 43 is cut out in the restricted contour indicated in Figure 1 to provide for this arrangement.

In the use of the unit, the pair of assemblies are placed on a rafter timber or the like, spaced according to the length that the rafter is to be cut. The assemblies are located for this purpose with the tape 23 pulled out to keep them, at the same time, positioned for the work to be done at both ends of the proposed rafter, without further adjustment as to length. The incidental adjusting of the scale or ridge cut slide 60 and the square member or ridge cut plate 22 is then done to bring them in the position necessary for the scribing of lines across the proposed rafter for cutting. If the work to be done includes the cutting of a rafter, the following instructions will explain the manner in which the unit is used. In the drawings, the plate base and ridge total is 24 inches in length, together. A rafter shorter than 24 inches is marked off by marking off the plate cut assembly 20 and the length on the side of the ridge cut assembly 21. Then the assembly 20 is slid back to the ridge cut, marked and allowance made for half the thickness of the ridge board. When half the thickness of the ridge board is figured and marked, the ridge cut blade 74 is moved back to this line and the rafter marked off for length. When the rafter is from two feet to 50 feet long, the steel tape 47 is used in conjunction with both assemblies. The steel tape begins measuring at 24 inches. The length of the rafter is read on the pulled-out steel tape from a point even with the back of the ridge base 21. The ridge board scale is adjusted for half the thickness of the ridge board back of the ridge base. The ridge base 21 is slid back even with the adjustment made on the ridge board scale. Then the rafter is marked for length in front of the ridge cut blade.

The plate cut slide 32 enables the user to compute the distance from the top edge of a rafter to where the plate cut is marked. Registering any of the numbers selected with the zero mark indicates how far down on the side of the rafter the plate cut will be registered on a 2 x 4 rafter. On a 2 x 6 rafter the cut will be further down on the rafter. In connection with the ridge cut slide 55, the same condition arises as that described for the plate cut slide. Any number registered on the slide with the zero mark will indicate how far down on the rafter the cut is to be made. The measurements on the plate blade and ridge blade can be used in the same way as those on the slides are employed.

Taking the assembly shown in Figure 1, the wooden timber or beam 50 is in dotted outline ready to be marked up and on which it lies longitudinally. The plate cut slide or slider plate 32 reciprocates in grooves 37 in the column piece 38, permitting it to mark off a hip and valley rafter and common and jack rafter for rafters 1.3 inches and 1 inch thick, respectively, as noted by the calibrations 33. These thicknesses are twice the figures given. The scriber is used on the beam by drawing lines on the inner borders of the arms 24 and 25. The direction of cut desired is determined by the inner border to be used. At the opposite end of the rafter where the second assembly 21 is located, the scale or ridge cut blade 60 is positioned similarly; the calibration 62 on the arcuate protrusion 61 being registered through the window 63 with the zero mark on the end portion of the base or ridge base 43. After the marking lines are scribed on the beam, the latter is cut along them and the desired rafter is produced. The other movable parts of the assemblies can be adjusted as indicated and any situation that requires variations to suit them may be made. This will be evident to those skilled in the art and will not require a complete summary of all the possibilities involved in their operations and use. The adjustments are very minute, and with them is included the vernier 82 and the levels 80 and 90, so that the accuracy of the unit can be made very close, and almost every situation arising in rafter and the like work can be provided for. The steel tape 23 connects the two assemblies together so that they will cooperate fully and accurately as a unit and avoid the need of special measurements independent of the assemblies before or after the latter have been used. The tape permits the full rafter to be considered and observations made to see that the layout is as accurate as to length as it is to the specific cuts to be made. This saves time, and eliminates a great source of error previously existing. Every measurement and line scribed through the use of the unit can be checked readily before cutting is proceeded with. The apparatus used is simple and compact and its operating parts are easily, conveniently and expeditiously manipulated. The use of the tape for facilitating the spacing of the assemblies is not only convenient, but presents an ingenious method of avoiding the conventional bars and struts that ordinarily would have been chosen and attached to accomplish the same function, and at the same time be cumbersome, heavy and hard to handle. In this invention the tape affords a simple, light, flexible and inexpensive element that accomplishes this particular duty just as effectively.

In the definition of the field of work that this invention is applicable to, it is intended primarily that it is for use in such carpentering work as required for the making of wooden rafters and allied structures that are conventionally required in the construction of residence buildings. However, layout work is intended broadly to include the marking out with lines and other suitable indications visibly noticeable of materials in the raw, semi-finished or unfinished states. Such marking primarily is employed to provide for the materials to be cut or reduced in length, width or section to meet definite requirements pertaining to their future use where the surfaces to be marked are flat and regular.

While but one form of the invention has been disclosed in the drawings and description, it is not desired to limit this application for patent to this specific structure, as it is appreciated that other forms could be developed and constructed that would employ the same principles and come within the scope of the appended claims.

Having thus described the invention, what is claimed is:

1. In a rafter layout unit, a plate cut assembly comprising a base adapted to be supported on the upper side of the rafter at a select point therealong, means carried by said base and engaging said rafter for detachably securing said base in said select position, a slider plate disposed transversely of said base contiguous to one side thereof and mounted on the latter for transverse reciprocatory movement, a square member including a pair of arms extending at right angles with respect to each other adapted to overlie and confront a side face of said rafter and mounted at the joined ends of said arms on the adjacent end of said slider plate for rotary movement with respect to said slider plate, and means carried by said square member and engaging said sliding plate for detachably securing said square member in a select position of its rotary movement with respect to said slider plate.

2. In a rafter layout unit, a plate cut assembly comprising a base adapted to be supported on the upper side of the rafter at a select point therealong, means carried by said base and engaging said rafter for detachably securing said base in said select position, a slider plate disposed transversely of said base contiguous to one side thereof and mounted on the latter for transverse reciprocatory movement, a square member including a pair of arms extending at right angles with respect to each other adapted to overlie and confront a side face of said rafter and mounted at the joined ends of said arms on the adjacent end of said slider plate for rotary movement with respect to said slider plate, and means carried by said square member and engaging said sliding plate for detachably securing said square member in a select position of its rotary movement with respect to said slider plate, and means carried by said base for engaging said slider plate for detachably securing the latter in a select position of its transverse reciprocatory movement.

3. In a rafter layout unit, a plate cut assembly comprising a base adapted to be supported on the upper side of the rafter at a select point therealong, means carried by said base and engaging said rafter for detachably securing said base in said select position, a slider plate disposed transversely of said base contiguous to one side thereof and mounted on the latter for transverse reciprocatory movement, a square member including a pair of arms extending at right angles with respect to each other adapted to overlie and confront a side face of said rafter and mounted at the joined ends of said arms on the adjacent end of said slider plate for rotary movement with respect to said slider plate, means carried by said square member and engaging said sliding plate for detachably securing said square member in a select position of its rotary movement with respect to said slider plate, means carried by said base for engaging said slider plate for detachably securing the latter in a select position of its transverse reciprocatory movement, and means carried by said base for levelling the latter with respect to a reference surface.

MARVIN W. WILLIS.

REFERENCES CITED

The following references are of record in the file of this patent:

UNITED STATES PATENTS

| Number | Name | Date |
|---|---|---|
| 748,094 | Parker | Dec. 29, 1903 |
| 913,703 | Darter | Mar. 2, 1909 |
| 1,852,277 | Wheeler | Apr. 5, 1932 |
| 2,286,669 | Carr | June 16, 1942 |

FOREIGN PATENTS

| Number | Country | Date |
|---|---|---|
| 545,027 | Germany | Mar. 3, 1932 |